United States Patent [19]
Dubuc

[11] Patent Number: 5,915,748
[45] Date of Patent: Jun. 29, 1999

[54] METHOD FOR FABRICATING A SOLID SURFACE COUNTERTOP IN A MOBILE FABRICATION UNIT

[76] Inventor: Paul C. Dubuc, 2 Overlook Dr., Bristol, R.I. 02809

[21] Appl. No.: 08/952,446

[22] PCT Filed: Jul. 24, 1997

[86] PCT No.: PCT/US97/12560
§ 371 Date: Nov. 20, 1997
§ 102(e) Date: Nov. 20, 1997

[87] PCT Pub. No.: WO98/04434
PCT Pub. Date: Feb. 5, 1998

Related U.S. Application Data

[62] Division of application No. 08/686,554, Jul. 26, 1996, Pat. No. 5,791,713.

[51] Int. Cl.[6] .......................................................... B23P 13/04
[52] U.S. Cl. ............................................. 29/557; 409/182
[58] Field of Search ............................... 29/897.32, 557, 29/DIG. 67; 407/54; 409/182

[56] References Cited

U.S. PATENT DOCUMENTS

| | | |
|---|---|---|
| 4,529,343 | 7/1985 | Adams . |
| 4,768,570 | 9/1988 | Honeyman . |
| 4,814,220 | 3/1989 | Brathwaite . |
| 5,137,098 | 8/1992 | Raffaeli . |
| 5,354,592 | 10/1994 | Miskell . |

*Primary Examiner*—David P. Bryant

[57] ABSTRACT

A mobile unit (1) for fabricating solid surface construction materials is provided, as is a method of use therefor. The mobile unit is equipped with climate control units (23, 23a) fabrication equipment (24) and other environment control equipment and is brought directly to a worksite. Therefore, solid surface construction materials can be fabricated onsite, instead of at a remote fabrication shop. In the fabrication process according to the present invention, dimensional information is laid out directly onto the solid surface material stock. This eliminates the frequently inaccurate use of a temporary template, as in the known art.

26 Claims, 4 Drawing Sheets

METHOD FOR FABRICATING A SOLID SURFACE COUNTERTOP IN A MOBILE FABRICATION UNIT

REFERENCE TO RELATED APPLICATIONS

This application is a division of U.S. Ser. No. 08/686,554, filed Jul. 26, 1996, now U.S. Pat. No. 5,791,713.

BACKGROUND OF THE INVENTION

1. Field of the Invention

The present invention relates to a mobile fabrication unit for use in fabricating solid surface materials, especially construction materials.

2. Description of Related Art

In recent years solid surface construction materials have become increasingly popular, especially for use as a countertop surface. The term "solid surface" construction material refers to a number of different products, such as CORIAN by Dupont, FOUNTAINHEAD, and other synthetic materials as well as solid surface veneer such as NUVEL by Formica and similar products sold by Wilson Art.

The fabrication of such products may be tightly controlled, for example. Dupont, for example, sells CORIAN only to certified fabricators who have fabrication shops that meet certain strict standards set by Dupont.

However, the traditional system and method for fabricating such sheet materials typically takes several days to complete.

First, a crew of people must take the necessary measurements for a particular job, such as measuring out a countertop. This typically involves a process referred to as "templating," namely, using particle board, plywood, cardboard or other disposable material, and creating a template, or a pattern, for cutting the solid surface material stock as required. The template is then taken back to an offsite fabrication shop where the solid surface material is fabricated accordingly. The thus-fabricated solid surface material is then transported back to the worksite and installed. Often, the above-described templating process is relatively inaccurate, so measuring errors and the like occur, and must be compensated for in an additional onsite final fitting process. Because of this, the entire process typically requires more than one week to complete. This is highly problematic from the fabricator's perspective in terms of staffing and work flow. Moreover, from the customer's point of view, the large amount of time and labor required is inconvenient and, indeed, disruptive. For these reasons, it is believed that the conventional fabrication process may restrict, or even discourage, customers from purchasing and installing solid surface construction materials, such as CORIAN.

SUMMARY OF THE INVENTION

It is therefore an object of the present invention to develop a system and method for faster and more efficient fabrication of solid surface materials. This objective is achieved by providing a mobile fabrication system and a fabrication process according to the present invention.

The system of the present invention involves a mobile unit that is either self-propelled (such as a stepvan or panel truck) or adapted to be pulled by a vehicle, such as a trailer pulled by pickup truck or the like. The mobile unit according to the present invention characteristically contains or is otherwise provided with all of the equipment necessary to fabricate solid surface construction materials. To provide a satisfactory work environment the mobile unit must have adequate lighting, ventilation, climate control, power supply and work surfaces. The present inventor has found that in the context of solid surface fabrication there are certain minimum requirements for each of these characteristics.

Fabrication of solid surface materials in a confined area presents several technical challenges. One significant example, is the need to provide adequate ventilation while maintaining climate control, at least in localized areas. More specifically, fabricating solid surface materials entails a great deal of cutting and sanding, which generates significant amounts of dust. This dust must be removed from the work area. On the other hand, solid surface fabrication also requires climate control, particularly in the area where the solid sheet is being fabricated. The fabrication process is hampered if the area around the sheet material is too hot or too cold.

To remove the dust generated from fabrication from the air within the work area, large volumes of air must be moved. But, moving large volumes of air makes it difficult to control temperatures. The present invention addresses these conflicting requirements by providing high volume ventilation and climate control equipment and by locating such equipment to optimize the work environment. Specifically, ventilation equipment is provided in the area above the solid sheet material and climate control equipment is provided in the area below the solid sheet material.

The process according to the present invention involves the unique step of measuring out dimensional information directly onto the solid surface material itself, without an intermediate template as discussed above. This is made possible because the mobile unit can be brought directly to a worksite. Therefore, the solid surface material stock can be brought to the worksite and can be fabricated on location, rather than needing to bring a temporary, and frequently inaccurate, template back to an offsite shop where fabrication is carried out, as in the known art. This increases the accuracy and speed of fabrication.

These and other objects and novel features of the present invention will become more apparent from the following detailed description, taken in conjunction with the accompanying drawings.

DETAILED DESCRIPTION OF THE PREFERRED EMBODIMENTS

Figure 1:
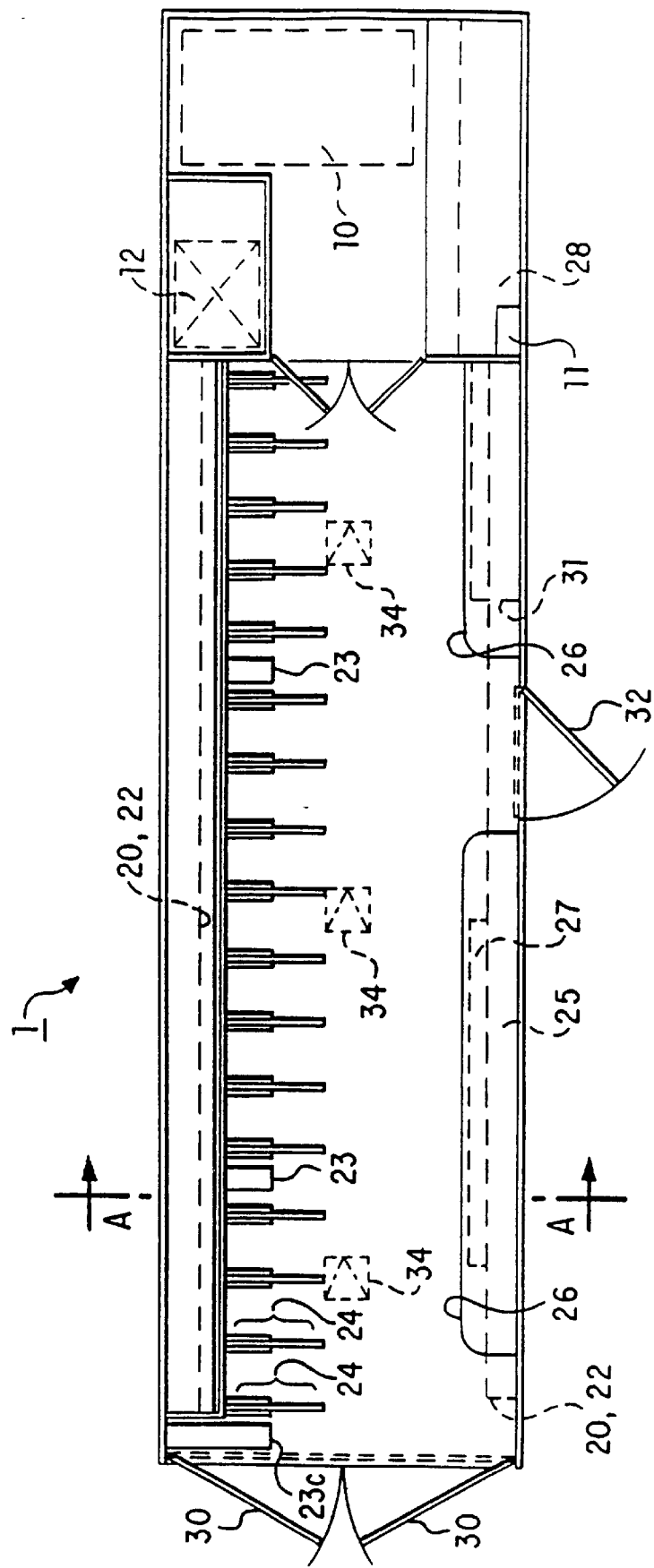
FIG. 1 is plan view of the mobile fabrication unit according to the present invention.
Figure 2:
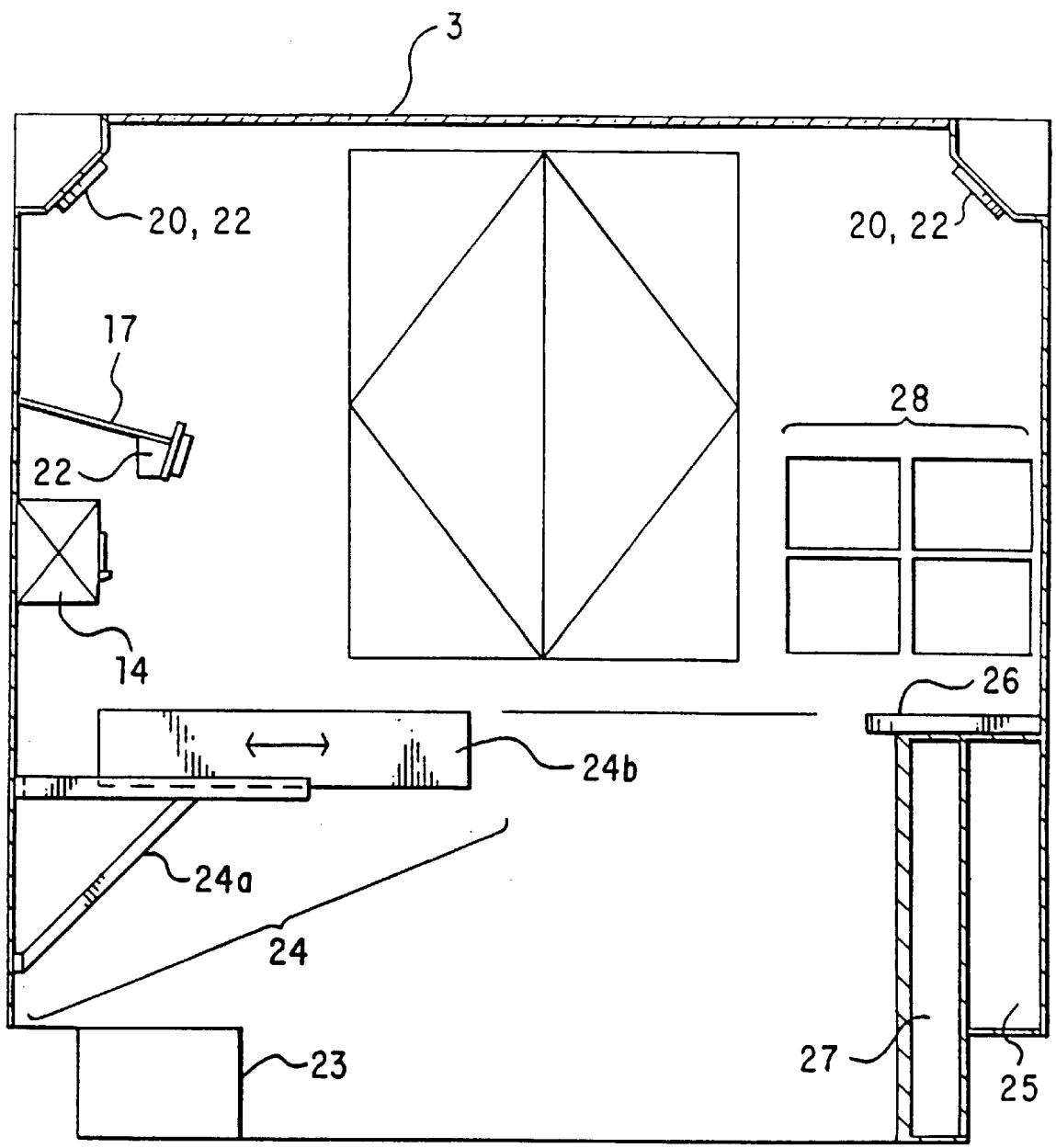
FIG. 2 is a cross-sectional view of the fabrication unit taken at line A—A in FIG. 1.
Figure 3:
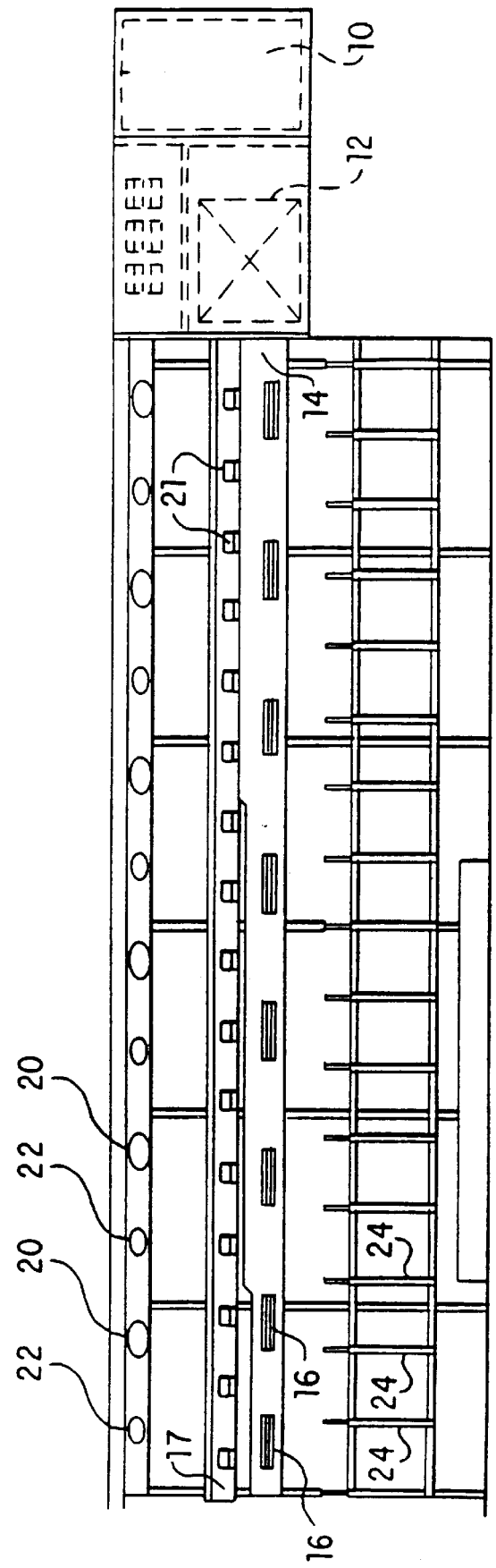
FIG. 3 is a cross-sectional view showing the left side of the interior of the fabrication unit shown in FIG. 1.

The system according to the present invention includes a housing, preferably in the form of a wheeled vehicle body, such as trailer 1, as seen in FIGS. 1–4. For clarity, the wheels of trailer 1 are not shown.

Also, for the purpose of discussion, only the example of a trailer is discussed here. However, it is contemplated and emphasized that an alternative arrangement of the present invention may, for example, take the form of a motor vehicle provided with an engine, a steering system, etc. Such motor vehicles may include conventional panel trucks or stepvans having their interiors equipped and laid out according to the present invention.

The type of vehicle that can be used is variable, and corresponds to a desired capacity for fabrication and available manpower. For example, a smaller step van may be manned by even a single worker for smaller jobs, whereas a longer trailer may be manned by 2 to 4 workers, and offers an increased fabrication capacity.

The trailer 1 has transparent or translucent wall and/or ceiling panels which transmit ambient exterior light, such as sunlight, to the interior of the trailer to permit natural light illumination thereof. This helps to reduce power consumption, and, therefore, operating costs, by reducing the need for electric interior lights.

In addition, some solid surface material stock is supplied in a variety of colors (e.g., Corian is supplied in 51 colors). Therefore, in processing and fabricating the solid surface material, color matching is an important issue. Thus, it is very useful to provide natural sunlight to the interior of the trailer for the purpose considering the "natural" coloring of the solid surface material. In this regard, the present inventor has found that it is advantageous if at least 50% of the surface area of the trailer ceiling is made of light transmitting (translucent or transparent) material as shown at 3 in FIG. 2.

In addition, the trailer is preferably provided with task lighting 22 under any horizontal shelves that extend above the work surface so that the shelves do not cast shadows on the work surface.

The trailer 1 also includes a power supply, such as a conventional gas-powered generator 10, for generating electricity. Alternatively or in addition, a power line hookup 11 may be provided, whereby electrical power can be drawn from an onsite source, such as from power cables located onsite. Also, a portable power generator may be used, according to the present invention. The power requirements according to the present invention are expected to be highly variable. However, presently contemplated power loads are about 7500–8000 kW.

A plurality of conventional electrical outlets 21 are provided at various convenient locations within the trailer 1, such as at intervals along an edge of tool shelf 17, discussed further below. The electrical outlets are provided, for example, in quad-clusters of conventional, three-pronged outlets. All of the electrical outlets are electrically connected to the power supply, such as the gas generator 10. Preferably, the outlets and lights are provided on a separate circuit.

The present inventor has found that fabricating efficiency is improved if there is always an outlet within easy reach of the fabricator. Accordingly, to facilitate fabrication, the trailer preferably includes at least one outlet for every two linear feet of trailer length and the outlets are provided on at least one of the longitudinal side walls of the trailer such that there is no more than three feet between adjacent outlets, and there is at least one outlet for every two linear feet of side wall length.

The fabrication of solid sheet materials involves extensive cutting and sanding, which in turn generates significant amount of cutting and sanding dust. In a relatively small enclosed space, such as a trailer where fabrication is taking place, much of this dust will be airborne. The presence of excessive amounts of airborne dust can significantly impact the working conditions in the trailer in a negative way. Thus, the present inventor has found that it is critical to provide ventilation means for removing excess cutting dust.

An active (for example, fan-driven) ventilation unit 12, preferably powered by the aforementioned power supply, is provided and preferably includes an air filtering mechanism to remove particulate matter, especially cutting and sanding dust, generated during the fabrication process. In particular, the ventilation system unit draws air out from the interior of the trailer 1 and discharges it to the exterior thereof. The air is preferably filtered by the aforementioned air filtering mechanism before being discharged. The air filtering mechanism may be conventional, as long as it is effective for substantially removing the particulate matter associated with cutting and sanding the solid surface construction material.

The capacity of the ventilation unit depends, to a large extent, on the interior volume of the trailer. Since the trailer's height and width are generally constant within a narrow range, the necessary ventilation capacity can be related to the length of the trailer. More specifically, the present inventor has found that to ensure adequate removal of airborne dust, the trailer should have a ventilation capacity of at least 100 cubic feet per minute (cfm) for each linear foot of trailer length. Thus, for example, a 26 foot trailer must have ventilation capacity of at least 2,600 cfm. Preferably, however, the trailer should have even more ventilation capacity, i.e., in excess of 250 cfm per linear foot of trailer length. The currently preferred embodiment of the present invention, for example, has ventilation capacity of 7,200 cfm in a 25.75 foot trailer or about 280 cfm per linear foot.

In particular, the ventilation system according to the present invention includes an elongate exhaust duct 14 connected to the fan-driven ventilation unit 12. The exhaust duct 14 preferably extends along the longitudinal length of the trailer 1, and more preferably extends substantially the entire longitudinal length of the trailer. As shown, the duct 14 has one end adjacent the ventilation unit 12 and one end remote therefrom. The duct 14 preferably tapers toward the remote end so that the remote end is smaller in at least one direction so that the sectional area of the interior of the duct is smaller at the remote end. The exhaust duct has a plurality of apertures 16 provided therein, through which air is taken in from the interior of the trailer 1. The apertures 16 can be independently opened or closed in order to provide or even concentrate airflow in particular portions of the interior.

In keeping with the desire for increased efficiency according to the present invention, the ventilation unit 12 is actuable by a pull-cable extending along the longitudinal length of the trailer 1. The pull-cable is connected to a microswitch or the like to provide pull-on/pull-off operation of the ventilation unit 12. Thus, a worker can pull the cable from virtually anywhere along the length of the trailer, without having to go to a specific switch and possibly interfering with coworkers.

In addition, passive vents 34 may be provided in, for example the ceiling of trailer 1. The provision of vents 34 provides a consistent airflow inwardly from the vents 34 and outwardly through the apertures 16 in the exhaust duct 14.

The trailer 1 is equipped with a plurality of conventional, electric-powered tools (not shown) for fabricating the solid surface material, powered by (i.e., plugged into) the aforementioned electrical outlets 21. The tools are characteristically distributed throughout the interior of the trailer 1 so as to be "within arm's reach" from virtually any location. This is advantageous because, again, workers do not need to move very far, if at all, within the trailer 1 to reach a required tool. Therefore, one worker is less likely to interfere with another's work. Accordingly, productivity increases. The tools provided in the trailer are those conventionally used for solid surface material fabrication, such as routers, sanders, and the like. Each tool is held on a tool shelf 17 mounted on a wall portion of the trailer.

The trailer also includes climate control means in the form of heating and/or cooling systems. Climate control within the trailer is, of course, important to ensure the personal comfort of persons working within the trailer. The present inventor has found, however, that even more precise localized climate control is important in the fabrication process. In particular, during the fabrication process various adhesives and other compounds are used to join pieces. The rate of drying of these adhesives depends on the temperature. The present inventor has found that the adhesive will dry too slowly if the temperature in the region where such an adhesive is applied is below 55° F. Conversely, if the temperature in the region where the adhesive is applied is above 90° F., the adhesive will dry too quickly. Thus, the fabrication process of the present invention preferably includes the step of maintaining the area around the solid surface material, particularly the region where adhesive is applied, at a temperature between 55° F.–90° F. The present inventor has found that the optimal temperature range is 60° F.–75° F. Thus it is most desirable to provide a climate control means that can maintain the temperature of the region where adhesive is applied at 60° F.–75° F.

To achieve the desired heating or cooling, the climate control means preferably comprises a plurality of climate control units 23 such as radiant heaters, hot air blowers, air conditioners, heat lamps or heat pumps or a combination thereof. The currently preferred embodiment includes two radiant heaters 23 located under the solid sheet supports. The radiant heaters are spaced along the length of the trailers. Another preferred embodiment includes hot air blowers that are located on the floor of the trailer. The hot air blowers draw air from beneath the trailer or from the side of the trailer, heat the air (if desired) and blow the air upward toward the solid surface material that is supported on the solid surface supports. The heating function can be disabled so that the blower serves as a cold air blower.

The preferred embodiment of FIG. 1 further includes a cooling unit 23c at a location near the back of the trailer. The cooling unit extends from a side wall of the trailer.

The location of the climate control units 23 beneath the solid surface support 24a, 24b is important because it permits more precise localized climate control in the vicinity of the solid surface material that is being fabricated in addition to more generalized climate control. Thus, for example, the temperature in the area where adhesive is being applied can be maintained in the range of 60° F.–75° F. by blowing hot or cold air onto the bottom side of a segment of solid surface material that is supported on the solid surface support. By providing a plurality (two or more) of climate control units 23 that are spaced along the length of the trailer it is possible to control the temperature at discrete segments of the solid surface material without controlling the temperature along the entire length of material that is being fabricated. Thus, for example, if one person is applying adhesive that requires temperature control while another person is performing a step that does not require temperature control (e.g., sanding or cutting) the unit that controls the temperature of the section of material proximate the person applying adhesive can be operated while the other unit can be turned off, if desired.

Locating the climate control units 23 beneath the solid surface material supports also helps in meeting the challenge of controlling climate/temperature while at the same time moving large volumes of air to remove dust. Specifically, the present inventor has recognized that dust removal is particularly significant in the region above the solid surface material. On the other hand, the inventor has recognized that the overall climate within the trailer can be controlled from a variety of locations within the trailer, but that the temperature in the critical region where adhesive is applied to the solid surface is best controlled from beneath the solid surface supports. In particular, when solid surface material is supported on the solid surface supports 24a, 24b and the ventilation units are provided above the solid surface material, the region beneath the solid surface material is, to some extent, a dead air zone that is not affected by the ventilation units. This is not a problem in connection with ventilation because dust located below the solid surface material is not a significant problem. Moreover, since the air is to some extent trapped under the solid surface material, the temperature of the air will not be significantly affected by the ventilation units. In other words, despite the fact that the ventilation unit moves large volumes of air the air under the solid surface material is not as quickly replaced as other air within the trailer. Thus, it is most efficient to control the temperature of the air in this region so that the temperature of the solid surface material (which is the upper boundary of the dead air region) can be controlled with some precision. Natural convection and heat exchange provide ancillary heating or cooling of the entire trailer. For these reasons, it is an important aspect of the present invention that the climate control units be located under the solid surface supports 24a, 24b and that the ventilation units be located horizontally above the solid surface supports.

Alternatively or in addition, the trailer 1 could be provided with a plurality of heat lamps 20 distributed through the interior thereof. The heat lamps raise the temperature within the trailer to promote rapid glue curing in a gluing step of the fabrication process. The heat lamps 20 also warm the interior of the trailer 1 in cold weather months to make working conditions more comfortable for the crew working therein.

In addition to the heat lamps 20, the trailer 1 may be usefully provided with at least one hot air heater unit which is conveniently located to heat the air within the trailer 1.

Also, the trailer 1 may be provided with one or more "hot boxes" (not shown). A hot box is a small, toaster oven-sized unit which has an interior space which can be selectively heated. A hot box is particularly useful for heating adhesive materials used in the fabrication process to a useful temperature level, particularly in cold weather months.

The trailer 1 may also be provided with lighting units to provide, or supplement, the light within the trailer 1. The lighting units may be, for example, a plurality of conventional lighting units 22 using incandescent or fluorescent light bulbs. The lighting units 22 are distributed about the interior of the trailer 1, such as along one or both of the side walls.

The heat lamps 20 and the lighting units 22, as well as the hot air heater(s), tools, and hot box(es), are powered by the aforementioned generator 10 or other power supply. Thus, it is noted here that the generator 10, (or alternative power supply), necessarily must be of sufficient capacity to adequately power the equipment connected thereto.

The electrical system in the trailer 1 preferably includes two circuits, each "guarded" by a respective circuit breaker panel from which power supply is selectively controlled. One circuit includes the utilities, such as the lighting units, the heat lamps, the hot air blowers, the hot boxes, etc. The second circuit includes the electrical outlets, and, therefore, the fabrication tools, such as routers, sanders, and the like.

Thus, the heat lamps 20 and lighting units 22 may be turned on and off from one of the circuit breaker boxes, which may be located at the forward end of the trailer 1, for example. In an alternative arrangement, the heat lamps 20 and lighting units 22 may be operated by a pull cable system similar to that used with the ventilation system 12, with similar advantages in increasing efficiency.

In a typical arrangement, the heat lamps 20 in the forward and rearward "halves" of the trailer 1 can be independently turned on and off. The lighting units 22 are collectively turned on and off.

Finally, the trailer 1 includes several shelf spaces and work bench areas.

In particular, one side of the trailer is provided with a plurality of spaced apart and generally aligned support struts 24. In a particular example, the plurality of support struts 24 extend in a transverse direction of the trailer 1 and are substantially parallel to one another. Collectively, the support struts 24 support the solid surface material while it is being fabricated. When the solid surface material stock is pre-provided with a protruding element, such as a washbasin bowl, the protrusion may be arranged to fit between the support struts 24 so that the solid surface material is still conveniently and securely supported while being fabricated.

The support struts 24 are preferably adjustable with respect to height, direction of extension in a horizontal plane, and angle of extension in a vertical plane. They may, for example, slide along guide rails, grooves, or the like, and lock into a desired position. This can be done by conventional positional controlling mechanisms such as friction locks or the like.

In a preferred example, each support strut comprises a first portion 24a which is attached to the trailer wall, and second, slidingly extensible portion 24b which extends in substantially the same direction as the first portion 24a. Thus, the effective length of transverse extension of each support strut 24 can be selectively extended. Each second portion 24b may, for example, be provided with a cleat or other protrusion (not shown) along its bottom edge. The cleat slidingly engages a corresponding groove or slot in first portion 24a (not shown), such that second portion 24b can slide back and forth, but cannot be pulled in a direction perpendicular to the direction of sliding (i.e., directly upwardly).

In a particularly preferable arrangement, each second portion 24b is made from a sacrificial material, such as particle board, or lesser quality wood. However, the sacrificial material chosen must maintain sufficient rigidity to securely provide support. The use of a sacrificial material here is particularly useful because, when the solid surface material is trimmed with a router saw and the like, the underlying second portion 24b can simply be cut through, without needing to constantly reposition a work piece to avoid the second portion 24b. Thus, each second portion 24b becomes progressively nicked and partially cut, and is simply and conveniently disposed of when its structural integrity is sufficiently degraded.

At least one workbench area 26 is provided along the side of the trailer opposite the plurality of support struts. Preferably, this workbench comprises at least one elongated surface extending along the side of the interior of trailer 1. The aforementioned hot box can be placed on the workbench 26.

The support struts, with solid surface material supported horizontally thereon, constitutes the principal work surface within the trailer. It follows that to achieve efficient space utilization, the supports should extend substantially along the entire length of one side wall of the trailer. Thus, in accordance with another aspect of the present invention, support struts are provided along at least 70% of the length of the trailer side wall.

In addition, since solid sheet stock material typically comes in 12 ft. lengths, it is preferable that the length of the support surface within the trailer and the trailer itself be substantially a multiple of 12. More specifically, the length (L) when measured in feet of the support surface, measured in feet should be X(Y), where X is a whole number and Y is a length between 12–13 ft. Likewise, the interior length of the trailer sidewall on which the supports are mounted, when measured in feet, should be X(Y), where X is a whole number and Y is a length between 12–13 ft.

In addition to the foregoing features, convenience items, such as storage cabinets and work shelves and storage shelves may be provided in the interior of the trailer as required or as desired. For example, a storage cabinet 28 extends forward substantially to the front end of the trailer 1 for storing elongate materials such as particle board strips, straight edges, and bench strips.

Also, underneath the rear workbench 26, slot compartments 25 and 27 may be provided for storing particle board stock and solid surface material stock respectively.

Figure 4:
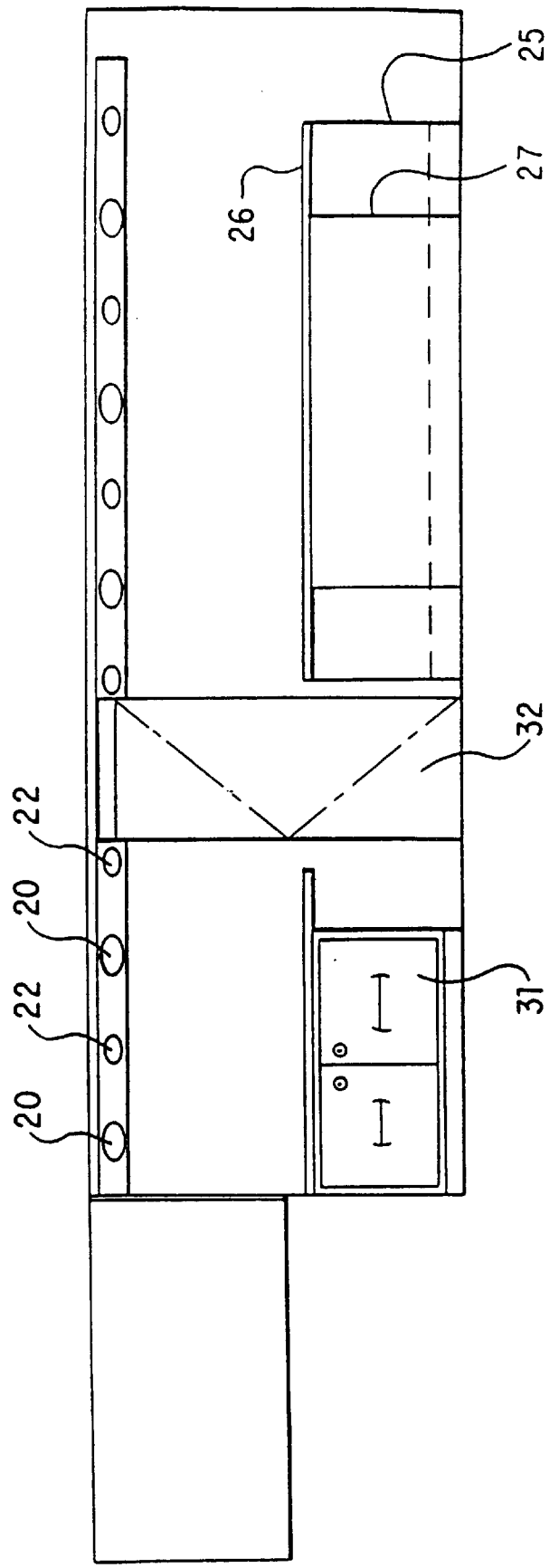
FIG. 4 is a cross-sectional view showing the right side of the interior of the fabrication unit.

An additional cabinet 31 may be provided under the forward workbench 26 (see FIG. 4).

Finally, the trailer 1 has at least one, and preferably two doors to allow entry into the interior thereof. A door 30 is provided at the rear end of trailer 1. Door 30 is preferably sized so as to permit full sized pieces of sheet construction material stock to pass freely therethrough. Also, a door 32 may be provided at the side of the trailer 1 to allow workers to enter and exit trailer 1.

Both doors are preferably left open, but are installed with a curtain (not shown) thereacross, similar to the type seen in the doorways of walk-in commercial freezers. Such curtains are commercially available from, for example, Grangers, an industrial supply store, under the name "Vinyl Slat Door". In general, the contemplated curtains include a plurality of flexible strips or slats made of plastic or vinyl or the like and hang, at rest, such that the individual plastic strips collectively shut off the doorway. This is important to retain heat in the trailer, for example. Moreover, the curtain structure enables a worker who may have both hands full to simply walk through the curtain (i.e., between the individual plastic strips) to enter and exit the trailer, without having to open and close a door. In addition, the curtains offer protection to those immediately outside the doors from being sprayed with debris thrown up from the routers and the like.

Finally, the curtains, depending on the material of manufacture, offer privacy to the workers in the trailer. In a preferable arrangement, in this regard, a lower portion of the curtain strips is substantially opaque to provide privacy, and an upper portion is transparent or translucent to permit exterior light to enter the trailer.

The fabrication process according to the present invention involves bringing the trailer to the worksite, forming a template directly on the solid surface material, cutting, while in the trailer, the solid surface material according to the template laid out thereon, forming the nose and head portion on the sheet material, and installing the fabricated solid surface material. Preferably, the trailer is brought within about 100 yards of the worksite because of the need to carry the solid surface material back and forth between the worksite and the trailer. Since this is frequently done by hand, it is desirable to reduce the distance the solid surface material needs to be carried. Thus, according to the present invention, the solid surface construction material is brought directly onto the worksite, possibly carried by the trailer itself. By laying out a template (that is, marking) directly on the solid surface material, the need for the conventional temporary template, as discussed above, is obviated. In particular, with the increased accuracy of subsequent fabrication, an additional fitting or adjusting step is virtually eliminated when the fabricated solid surface material is put into place. That is, the fabrication, done according to the present invention, is made so much more accurate that little if any adjustment has to be made in order for the fabricated piece to fit as desired. This virtual elimination of a complete step is a significant part of the time and work savings.

In addition, for reasons noted previously, the process of the present invention preferably includes the step of maintaining a region of the solid surface material where adhesive is applied at a temperature within the range of 55° F.–90° F. and more preferably within the range of 60° F.–75° F. The process also preferably includes the step of ventilating the mobile fabrication unit so as to displace at least 100 cubic feet per minute of air for every foot of mobile fabrication unit length.

While the present invention has been described with respect to what are believed to be the most practical embodiments thereof, it is particularly noted that this is by way of example only, and appropriate modifications and variations thereof are possible within the spirit and scope of the claims appended hereto.

What is claimed is:

1. A method for fabricating a solid surface material portion from solid surface material stock, comprising the steps of:

transporting a mobile fabrication unit to a location proximal to a worksite;

providing solid surface material stock at said worksite;

laying out dimensional information directly onto said solid surface material stock;

in said mobile fabrication unit, cutting and finishing said solid surface material stock according to said dimensional information laid out thereon, thereby obtaining a fabricated solid surface material portion; and installing said fabricated solid surface material portion at said worksite.

2. The method according to claim 1, wherein said step of transporting comprises transporting said mobile fabrication unit to within about 100 yards of said worksite.

3. The method according to claim 2, wherein said step of laying out dimensional information comprises directly marking said solid surface material stock.

4. The method of claim 1, further comprising the step of lighting the solid surface material stock with natural light while in said mobile fabrication unit.

5. The method of claim 1, further comprising the step of ventilating the mobile fabrication unit so as to displace at least 100 cubic feet per minute of air for every foot of mobile fabrication unit length.

6. The method of claim 1, further comprising the step of maintaining the temperature of a section of the solid surface material stock at a temperature of 60° F.–75° F. while adhesive is applied thereto.

7. A method for fabricating a solid surface material portion from solid surface material stock in a mobile fabrication unit that is transportable from one worksite to another worksite, comprising:

transporting the mobile fabrication unit to a location proximal to a worksite;

providing solid surface material stock at said worksite;

laying out dimensional information directly onto said solid surface material stock;

in said mobile fabrication unit, cutting and finishing said solid surface material stock according to said dimensional information laid out thereon, thereby obtaining a fabricated solid surface material portion; and installing said fabricated solid surface material portion at said worksite.

8. The method according to claim 7, wherein the mobile fabrication unit is transported to within about 100 yards of the worksite.

9. The method according to claim 7, wherein dimensional information is laid out by directly marking said solid surface material stock.

10. The method of claim 7, wherein the solid surface material stock is illuminated with natural light while in said mobile fabrication unit.

11. The method of claim 7, wherein the mobile fabrication unit is ventilated so as to displace at least 100 cubic feet per minute of air for every foot of mobile fabrication unit length.

12. The method of claim 7, wherein the temperature of a section of the solid surface material stock is maintained at a temperature of 60° F.–75° F. while adhesive is applied thereto.

13. A method for fabricating a solid surface material portion from solid surface material stock in a mobile fabrication unit that is transportable, the method comprising:

transporting the mobile fabrication unit to a location proximal to a worksite;

providing a plurality of substantially aligned and spaced apart supports within the mobile fabrication unit such that the plurality of supports define a solid surface support that extends on a substantially horizontal plane;

providing a plurality of electrical outlets within the mobile fabrication unit;

supplying electricity to said plurality of electrical outlets;

illuminating the interior of the mobile fabrication unit;

providing solid surface material stock at said worksite;

laying out dimensional information directly onto said solid surface material stock;

in said mobile fabrication unit, cutting and finishing said solid surface material stock according to said dimensional information laid out thereon, thereby obtaining a fabricated solid surface material portion;

circulating and filtering air within the mobile fabrication unit so as to remove dust from the air within the mobile fabrication unit; and installing said fabricated solid surface material portion at said worksite.

14. The method of claim 13, further comprising drawing air from within the mobile fabrication unit and discharging air from the mobile fabrication unit.

15. The method of claim 14, further comprising filtering the air drawn from within the mobile fabrication unit.

16. The method of claim 13, further comprising adjusting the extent of at least one of the supports to accommodate the shape of the solid surface material stock.

17. The method of claim 13, wherein a portion of a support is made from a sacrificial material and is cut as the solid surface material stock is cut.

18. The method of claim 13, further comprising supporting the solid surface material stock substantially horizontally on a support within the mobile fabrication unit.

19. The method of claim 13, further comprising heating the solid surface material stock from a location beneath the solid surface material stock.

20. The method of claim 13, wherein the mobile fabrication unit has an interior and an exterior and further comprising drawing air into the mobile fabrication unit and exhausting dust-laden air from the interior to the exterior of the mobile fabrication unit.

21. The method of claim 20, further comprising filtering the dust laden air before it is exhausted to the exterior of the mobile fabrication unit.

22. The method of claim 13, further comprising providing both artificial and natural lighting within the mobile fabrication unit.

23. The method of claim 13, further comprising transporting said mobile fabrication unit to within about 100 yards of said worksite.

24. The method of claim 13, further comprising lighting the solid surface material stock with natural light while in said mobile fabrication unit.

25. The method of claim 13, further comprising ventilating the mobile fabrication unit so as to displace at least 100 cubic feet per minute of air for every foot of mobile fabrication unit length.

26. The method of claim 13, further comprising maintaining the temperature of a section of the solid surface material stock at a temperature of 60° F.–75° F. while adhesive is applied thereto.

\* \* \* \* \*